United States Patent [19]

Jenny

[11] 3,970,994
[45] July 20, 1976

[54] COMMUNICATION SWITCHING SYSTEM

[75] Inventor: Christian Jakob Jenny, Thalwil, Switzerland

[73] Assignee: International Business Machines Corporation, Armonk, N.Y.

[22] Filed: Feb. 28, 1974

[21] Appl. No.: 447,177

[30] Foreign Application Priority Data
Mar. 21, 1973 Switzerland.......................... 4095/73

[52] U.S. Cl. ......................... 340/172.5; 179/15 AL
[51] Int. Cl.[2]...................... G06F 15/16; H04J 3/02; H04Q 3/42; H04Q 3/64
[58] Field of Search............. 340/172.5; 179/15 AL, 179/15 AQ, 15 AT, 18 GF

[56] References Cited
UNITED STATES PATENTS

| | | | |
|---|---|---|---|
| 3,544,976 | 12/1970 | Collins..................... | 179/15 AL UX |
| 3,629,854 | 12/1971 | Hauck............................ | 340/172.5 |
| 3,670,308 | 6/1972 | Tutelman........................ | 340/172.5 |
| 3,671,942 | 6/1972 | Knollman........................ | 340/172.5 |
| 3,856,993 | 12/1974 | Closs et al..................... | 179/15 AT |

Primary Examiner—Gareth D. Shaw
Assistant Examiner—Michael C. Sachs
Attorney, Agent, or Firm—John G. Wynn

[57] ABSTRACT

A communication switching system having distributed control and modular design including a loop structure to which processor modules and storage modules are attached. Input to and output from the loop are effected through line registers, one line register being provided for each communication line. The line registers also function as intermediate storage between sequential processing steps. The processor modules, which are physically separated from the storage modules, are allocated for each step of a task, completely independent of the communication line associated with that task, or any past allocation of that task. Accordingly, messages can be sent by a processor module to any one of the storage modules for fetching or delivering of data and then the data will be routed back to the processor modules. After all required processing has been accomplished, a message will be sent back to the associated line register containing new data, either for output to the line or for later reuse by the system.

11 Claims, 5 Drawing Figures

COMMUNICATION SWITCHING SYSTEM

BACKGROUND OF THE INVENTION

1. Field of the Invention

This invention relates to communication switching systems having distributed control and modular design.

2. Description of the Prior Art

Several modular switching systems are known in the prior art. Subdividing systems into complete modules allow stepwise extension or module replacement in case of failure. One of the prior art switching systems has a control which is not centralized, but distributed over the modules. Accordingly, during an operation there is a fixed assignment between each module and a particular area of the system, e.g., a particular group of lines, so that an optimum utilization of the modules is not possible.

Even in prior art modular systems, a central control is mostly provided which in turn is not modular. Under such conditions the advantages of stepwise extension and mutual replacement of modules are not possible for the central part of the system. This is particularly true for program control (computer control) switching systems comprising a central processor. Though these computer control systems are very flexible and allow provision of numerous services otherwise not available, they generally lack the advantages of modular systems. At least, the core of the system must be provided in duplicate if a breakdown of the total system, due to specific failures, is not acceptable. See for example, U.S. Pat. No. 3,856,993, filed Oct. 16, 1973, by Felix H. Closs et al, entitled "Time Division Multiplex Exchange," a continuation of Ser. No. 206,614, Dec. 10, 1971, now abandoned and assigned to the same assignee as the instant application.

Modular data processing systems are known in the art which comprise a plurality of computers. However, in these systems, central control is always assumed by one of the computers. Furthermore, the other computers must be particularly prepared for each task to be executed, i.e., program loading, etc. The central supervision and the preparation of individual computers for each task require additional working steps which can result in a relatively high portion of unproductive operating time in a switching system in which many but relatively short and simple tasks must be executed for a great number of customers.

OBJECTS OF THE INVENTION

Accordingly, it is an object of this invention to provide a system having distributed control and modular design, so that an optimum utilization of modules is made possible in an improved manner.

It is another object of the present invention to provide processing units with equal capabilities independent of a particular storage unit so that each unit is available by free allocation for executing all tasks for all communication lines attached to the system so that all units are fully utilized.

It is yet another object of the invention to make it possible to connect additional modules or disconnect modules without any modification of the system.

It is still another object of the present invention to provide a loop structure between functional units of the system that will allow distributed and autonomous control of the functional units.

SUMMARY OF THE INVENTION

The switching system according to the invention, by which these objects can be accomplished is characterized by a plurality of line registers associated to the communication lines to be connected, a plurality of processor modules and a loop-structured arrangement of interconnected branches on which data blocks can be transferred from each line register to each processor module, and from each processor module back to each line register. Scanning or extracting means are provided to extract from its line register any data block for which an appropriate communication is established, and to shift the data block onto the arrangement of interconnecting branches. Each processor module, provided it does not yet contain a data block for processing, is capable of accepting any one passing data block from an interconnecting branch, and in cooperation with an available storage module, executing an elementary processing step based on the control and switching information contained in that data block, and finally releasing the data block to an interconnecting branch.

Advantages of the switching system are its high availability and its optimum utilization of the functional units. Due to the fact that data blocks permanently assigned to the communication lines are used for storage as well as for transfer of control, status and switching data, a favorable data flow is achieved requiring few additional accesses and transfers for each operation.

By further dividing the processing into elementary steps and due to the loop-structure of interconnecting busses, the switching system can also cope with extreme situations such as the failure of some of the functional units.

An adaptation to altering requirements is easily possible. For example, if additional communication lines have to be served, the number of line registers is increased. For handling increased internal processing traffic, further processor modules and storage modules are simply added.

Operability of the system is maintained in situations when one or more processor modules become inoperative, although with decreased efficiency, because each processor module which remains in operation is capable of executing any processing task required by the system.

The foregoing and other objects, features and advantages of the invention will be apparent from the following more particular description of the preferred embodiments of the invention as illustrated in the accompanying drawings.

GENERAL DESCRIPTION

Following is a general description of the switching switch. A more detailed description of the switching system, according to the invention, is described herein under the heading "Detailed Description".

Figure 1:
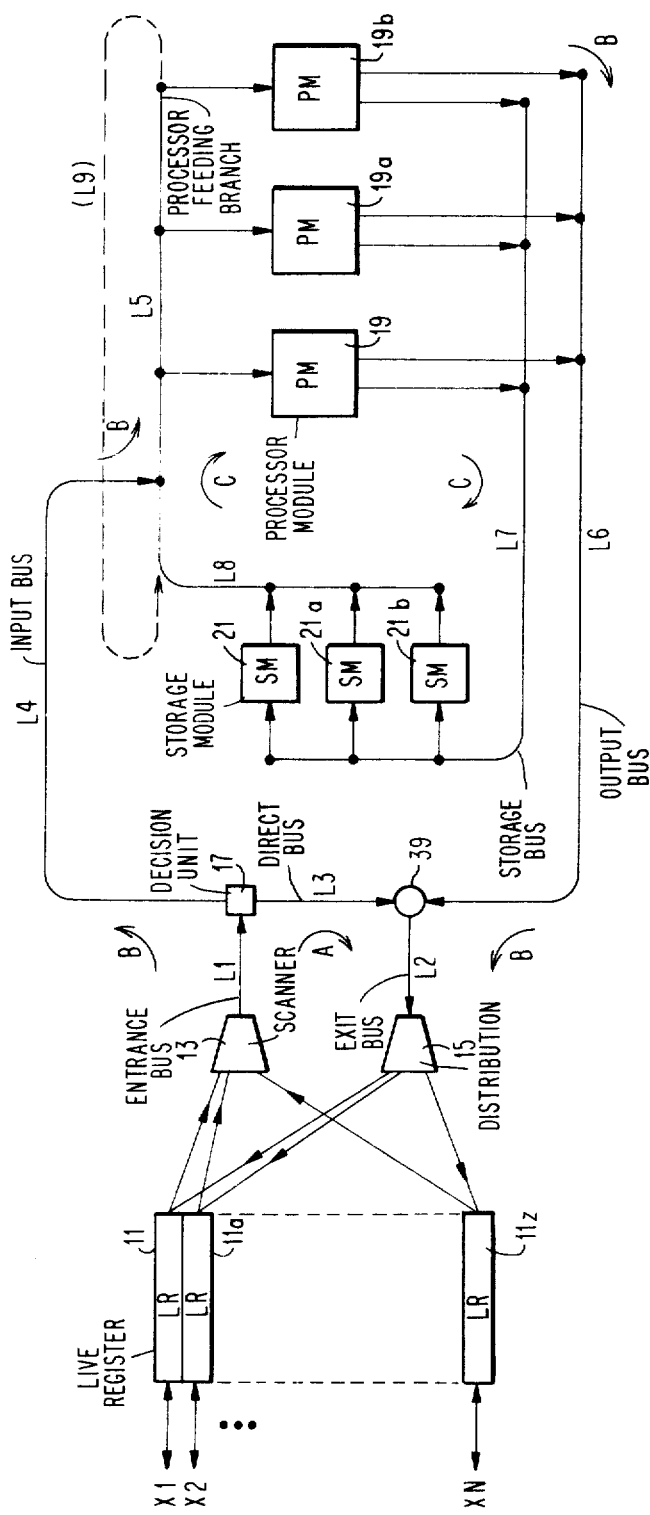
FIG. 1 depicts the basic layout of a switching system according to the invention.

The basic arrangement of an embodiment of the switching system, according to the invention, is depicted in FIG. 1. Its main components are line registers LR (11 . . . 11z), processor modules PM (19 . . . 19b), storage modules SM (21 . . . 21b) and a number of interconnecting busses L1 . . . L8 which together constitute a loop-structured network.

Exemplary processors such as can be used for processor 19 are well known in the art. Typical of processors that can be utilized in the system are the Intel 880 and IBM system/3. The aforementioned Intel 880 processor is available on the market as well as the IBM System/3 which is described in U.S. Pat. No. 3,701,105.

Figure 3:
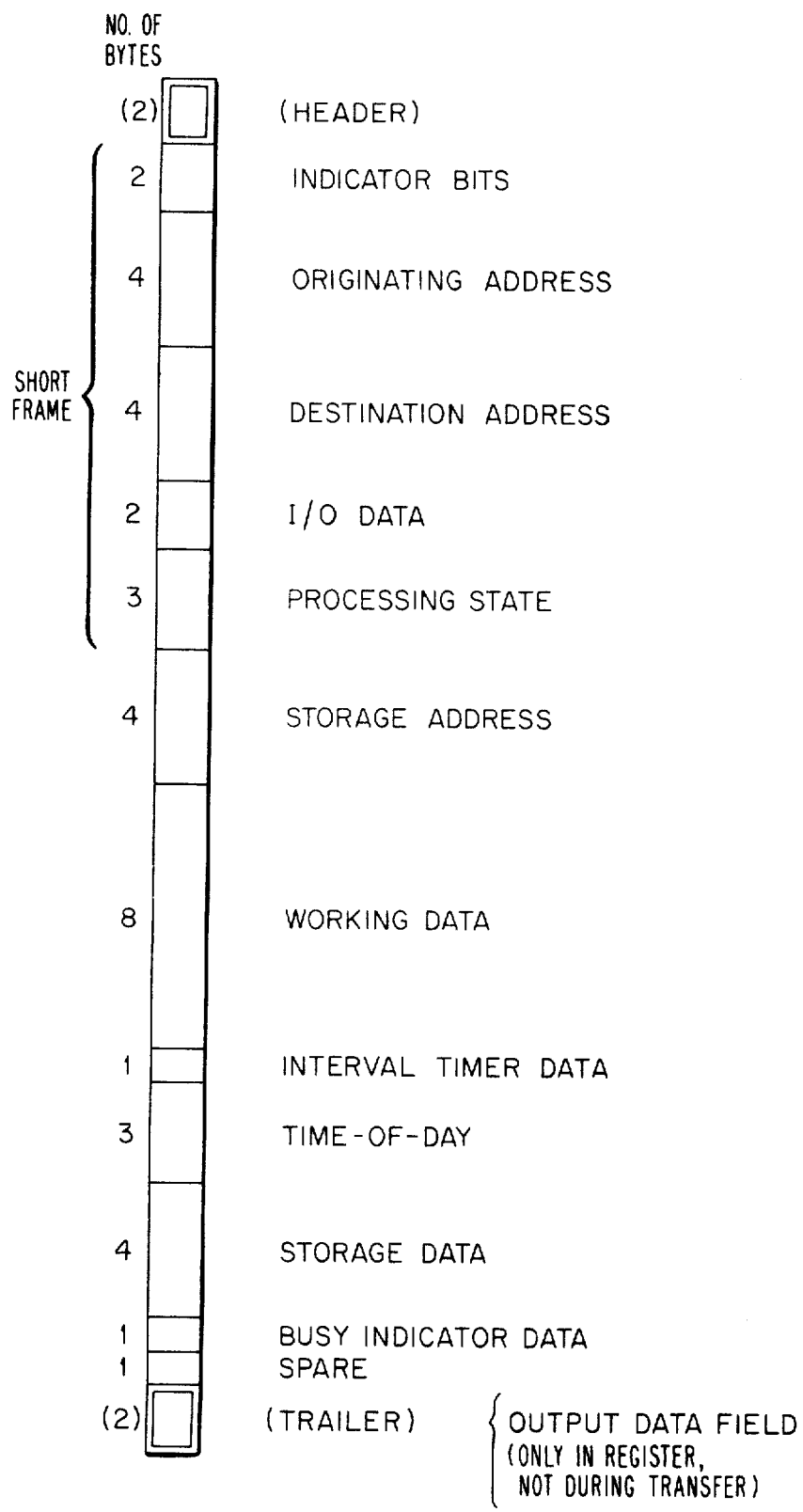
FIG. 3 shows the format of frames (data blocks) providing for storage of information and for its transfer in the loop-interconnecting network.

Operation of the switching system is based on the frame concept (FIG. 3). Each frame is a data block which provides for storing information on the one hand, and for conveying information on the other. One frame is assigned to each communication line (X1 . . . XN), shown in FIG. 1 (e.g., subscriber line). It contains the data essential for a communication connection and accepts information transferred over the line. When a frame is transferred to the processor modules it constitutes an elementary task which carries all important status information and switching data with it, and which returns with it the results after execution of the elementary task by a processor module (except additional or auxiliary data which is provided by storage modules (21 . . . 21b)).

Each of the communication lines (X1, X2 . . . XN) is associated with a line register LR (11, 11a . . . 11z) which has a capacity of one frame (plus some additional bytes for output buffering). Each frame comprises at least data fields for input/output data, an originating address, a destination address and status and control data.

Still referring to FIG. 1, the frames are transferred as follows: The frames are extracted from the line registers by scanner 13, then shifted via entrance bus L1 to the loop structure of interconnecting busses L4 to L8, forwarded to functional units PM and SM for processing and then returned to the line registers via Z-type interface unit 39, exit bus L2 and distributor 15.

Examples of published material of a typical distributor that could be utilized with this invention as unit 15 are given in the "Siemens Systems EDS" manual on page 10, 11 and in the "Siemens Systems EDS System Description" publication in FIG. 18. The publication is available as number D234/101/05.101: As 7711: 0733GN from Siemens Aktiengesellschaft, D-8000 Munchen 25, Postfach 701, West Germany. The distributor is considered well known in the art and the aforementioned publications are merely indications of the availability of published material thereon.

If no processing is required, but only transfer from one line register to another is desired, then a frame is forwarded via direct bus L3 and Z-type interface unit 39 directly from scanner 13 and entrance bus L1 to exit bus L2 and distributor 15. Decision unit 17 shifts the frames either to the processor path (input bus L4) or to the direct transfer path (direct bus L3). Interconnecting busses L1, L2, L3, etc., constituting a loop-structured bus network, are designated herein as bus branches, interconnecting branches, or simply branches.

Several groups (modules) of line registers (11, 11 . . . 11z), each with a scanner 13 and distributor 15, can be provided. To simplify the description, only one group (one module) is shown in FIG. 1. Functional units, which are important for operation of the switching system, are processor modules PM (19, 19a, 19b) and storage modules SM (21, 21a, 21b). Modules of each category are equivalent to each other and can be provided in any number, depending on the required efficiency of the system.

A frame, which is due for processing, proceeds from input branch L4 to processor feeding branch L5 where it can sequentially pass the inputs of all processor modules. The passing frame is accepted by the first free processor module, i.e., one that does not contain a frame for processing. A feedback branch L9 can be provided, so that a frame which did not find a free processor, during the first pass, can again be shifted to the processor feeding branch L5.

Each processor module PM is a simple and elementary data processing unit which will, according to a given program, execute with a received frame one processing step (an elementary operation) and which, thereafter, releases that frame with its contents modified. Each frame contains status data and processing data. From the status data, the processor module recognizes which processing step is to be executed and then extracts, if necessary, one data unit from the frame and inserts another data unit. Finally, the processor unit changes the status data so that it can be recognized that the processing step has been executed.

Storage modules SM store data which cannot be accommodated in the limited capacity of a frame, i.e., storage of additional data specific to a particular communication line, and also store converting tables, etc., which are common to all communication lines. To effect a storage access, a frame is sent from a processor module via branch L7 to a storage module, and after the storage access, it is returned via branch L8 to the processor module.

Decision unit 17, based on the contents of the frame, modifies or releases a connection or routing loop to operate on the frame data which is quasi divided into elementary tasks each of which is executed sequentially by transferring a frame and modifying its contents. Each elementary task is executed by one or by a plurality of sequential processing steps, i.e., by one or by a plurality of passes of a frame through a processor. The following are examples of elementary tasks or processing steps:

1. An elementary task which can be handled in one processing step is the erasing of particular fields of a frame after a connection has been released. The frame proceeds via L1, L4 and L5 to a processor module where the task indicated by the status data is recognized. Then the contents of the particular fields are erased. Finally, the frame is returned via branches L6 and L2 to the assigned line register.

2. The elementary operation of converting a dial number into a corresponding communication line address requires two processing steps because a storage access using a conversion table is necessary. The frame proceeds via L1 and L4 to a processor. In a first processing step, a storage address is generated from the status data and the dial number received with the frame. Thereafter, the frame leaves the processor and proceeds via L7 to a storage module. There, the storage address is used to read the associated line address which is then inserted into the frame. The frame then proceeds to a processor module via branches L8 and L5. The processor module recognizes from the status data that a line address was fetched. It then shifts this address to a certain location within the frame, and modifies the status data accordingly. Finally, the frame returns to its line register via L6 and L2.

Two factors which are essential for the operation of the switching system are as follows:

1. Each frame provides for storing switching data which is important to the associated communication line. When a frame is transferred for processing, it constitutes an elementary task.

2. Each frame searches for a free processor module when an elementary task is to be executed. There is no assignment between tasks and processor modules. No data is retained in a processor module after a processing step is finished. All essential data is carried by the frame with the exception of some additional data which may be stored in an assigned area of a storage module. Subsequent processing steps, for establishing a connection, thus may be executed in different processing modules.

The aforementioned factors are reflected in the loop structures of the network of interconnecting busses L1 . . . L8 as depicted in FIG. 1.

Loop A (Exchange Loop); L1-L3-L2

After establishing a connection, this loop provides for the exchange of data between pairs of line registers.

Loop B (Processing Loop); L1-L4-L5-PM-L6-L2

A frame proceeds over this loop to a processor module for processing and returns to the line register thereafter.

Loop C (Storage Access Loop); L7-SM-L8-L5-PM

A frame is transferred over this loop from a processor module to a storage module, and after reading or writing of data it is returned to a processor module.

DETAILED DESCRIPTION

Details of a more elaborate implementation are now described in connection with FIGS. 2a through 2c. The essential parts of the switching system shown in FIGS. 2a through 2c correspond to those in the schematic representation of FIG. 1. They are also designated by the same reference numbers.

In the description herein, reference is made, whenever necessary, to particular fields of the frames, i.e., data block for storage and internal transfers. The total format of a frame and the functions of its various fields are described later in connection with FIG. 3.

Input/Output: According to FIG. 2a, the system comprises a plurality of line registers which are grouped in line register modules LRM (31 . . . 31n) each including, e.g., 100 line registers. Each line register is permanently associated with one of the communication lines or subscriber lines which are to be connected to each other by the switching system. Each register has a storage capacity of one full frame plus an additional field for output data. The field "Originating Address" of each frame contains the address of the associated line register. The contents of this field are never changed.

Line adapters 33 connect the communication lines to the line registers. The line adapters provide analog-to-digital conversion, digital-to-analog conversion, synchronization for transmission, etc. The line adapters have access to the field "I/O data" of a frame (see FIG. 3) and the additional data field of a line register. Furthermore, the line adapters can set an input indication and reset a short frame indication, details of which will be discussed below.

An excerpt from "Communication Networks for Computers," pages 89 through 91 and pages 315 through 317 is cited as an example of line adapter 33.

Also cited is an article by H. J. Spoon, published in the "Phillips Telecommunications Review", December 1969, Vol. 28, No. 4, entitled "The Telegraph Input-Output Multiplexer for the DS 714 Method Switching System" pages 175 through 183, and the "IBM 3976 Modem Models 1 and 2 Component Description," bulletin number A19-0020-1. The aforementioned publications all describe and disclose line adapters of the type that can be utilized in the instant invention, and, accordingly, are well known in the art.

With each line register module 31 an input scanner 13 is provided which scans its associated line register cyclically and shifts a frame through an interface (Z) 35 to entrance branch L1 if certain indications are present. An output distributor 15, provided with each register module 31, extracts a frame from exit branch L2 through an interface (A) 37 if certain indications are present, and shifts the frame back to the line register indicated by the field "Originating Address". However, during this operation, the field I/O data is masked, i.e., this field is not written in the line register because new data may have been received in the meantime. If an output indicator was set in the frame, the field I/O data is transferred into the additional output field bit positions of that line register, so that the frame can be shifted from there to the communication line.

If certain control bits are set, selected fields of the frame are transferred to the line register corresponding to the "Destination Address". Thus, one particular frame can be accepted by two different distributors, i.e., either for storing it back into the line register of origin or for inserting selected data fields into another line register.

Direct Transfer: Entrance bus L1 and exit bus L2 are directly connected to each other through interface units (X) 17 and (Z) 39 and a direct branch bus L3, so that frames providing only for exchange of "short frame" data, which are described further below, can be directly transferred. Interface unit 17 decides from the contents of a frame whether the frame is to be shifted to the direct branch L3 or to input branch L4 leading to the switching facilities. In a short frame direct transfer, only data from the I/O data field of the originating line register is transferred to the additional storage field, "Output Data," of the designation line register.

Interface Units

The following is a short survey of the different types of interface units provided in the system. These units connect the functional units to the interconnected branches, or the interconnected branches to each other. Five different types of interface units are provided carrying the designations A, I, X, Y and Z.

A-Type Interface Unit

This unit extracts from the bus each frame which contains, in a specifically marked field, an address falling within a range associated to that interface unit, and shifts it to the connected unit, e.g., storage, or distributor. If a frame is not accepted, the interface unit shifts it over the interconnecting branch bus to the next interface unit. However, if a frame is accepted, it is replaced by an empty frame for maintaining synchronization.

I-Type Interface Unit

This unit shifts a frame from the interconnecting branch to the connected processor module, provided the processor module can accept the frame, i.e., not busy or in operation. If a frame is not accepted, it is shifted over the interconnecting branch to the next processor module. Also, an extracted frame is replaced by an empty frame on the interconnecting bus.

X-Type Interface Unit

This unit shifts a frame from its input to either one of two outputs depending on the value of a particular indicator bit in the frame. An empty frame is shifted to the other output.

Y-Type Interface Unit

This unit inserts, into a particular field of each frame passing through it, a current value from the connected functional unit, i.e., time-of-day unit. The previous contents of the field are erased.

Z-Type Interface Unit

This unit shifts a frame from the connected functional unit, i.e., scanner, processor module, to the interconnecting branch provided that an empty frame (time slot) arrives. As long as frames containing data are arriving on the interconnecting bus, the frame to be released is kept.

Interface units 17, 39, A, I, X, Y and Z, as utilized in the invention, are well known in the prior art. An excerpt from an article in IBM bulletin number 70-CP-370-COM by E. H. Stewart entitled "A Loop Transmission System" is here referred to on page 36-1 for a textual discussion, and FIG. 5 for an example of an interface unit that can be utilized with the invention. Also referenced is an excerpt of an article by J. M. Unk entitled "Communication Network for Digital Information," IRE Transactions on Communication Systems, December 1960, page 207–214, FIG. 2. These excerpts show exemplary well known interface units which can be used in combination in this invention.

Forwarding to Processing

Figure 2A:
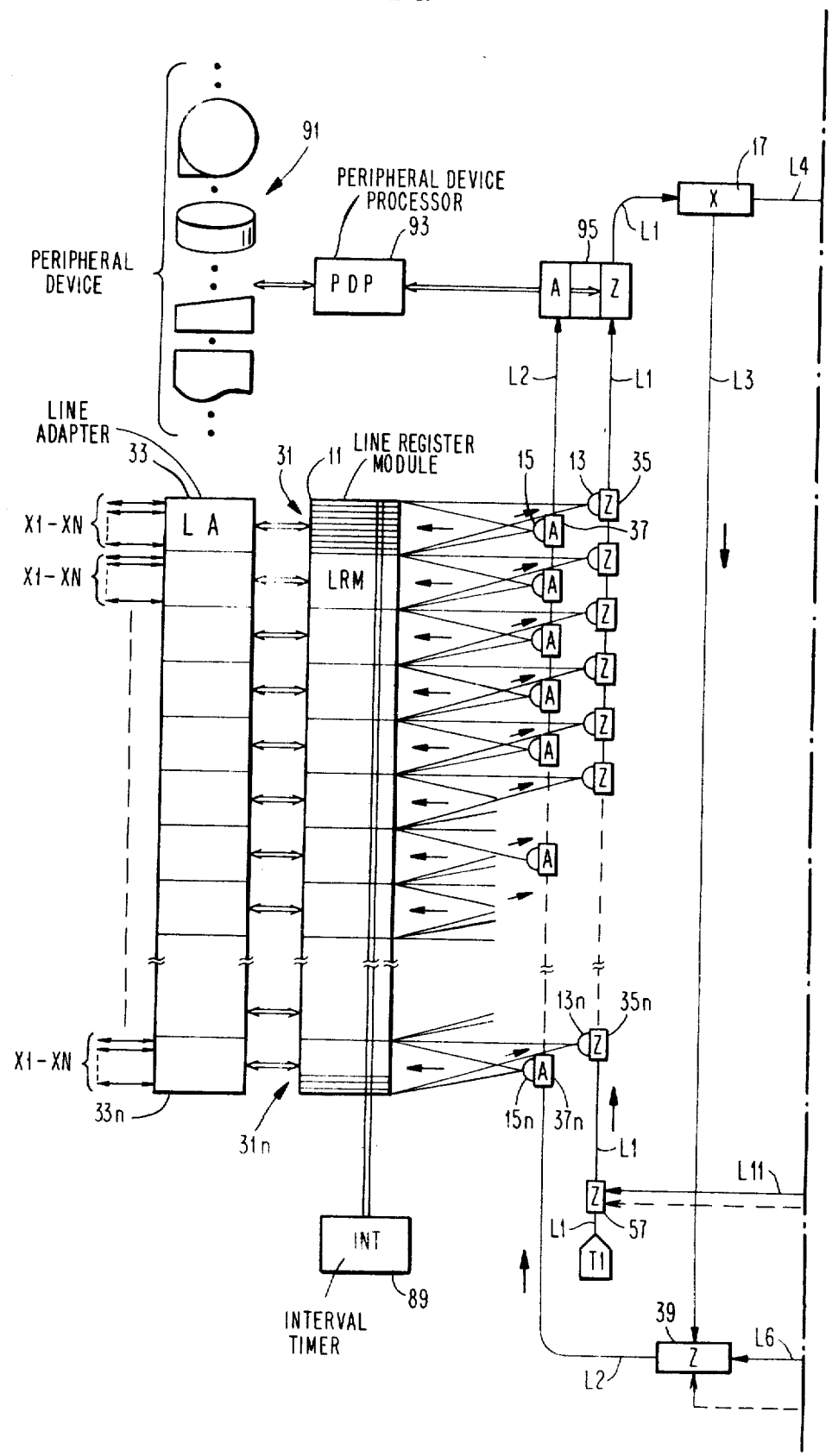
FIGS. 2a–c show a more detailed representation of an embodiment of the invention corresponding to the basic layout of FIG. 1.
Figure 2B:
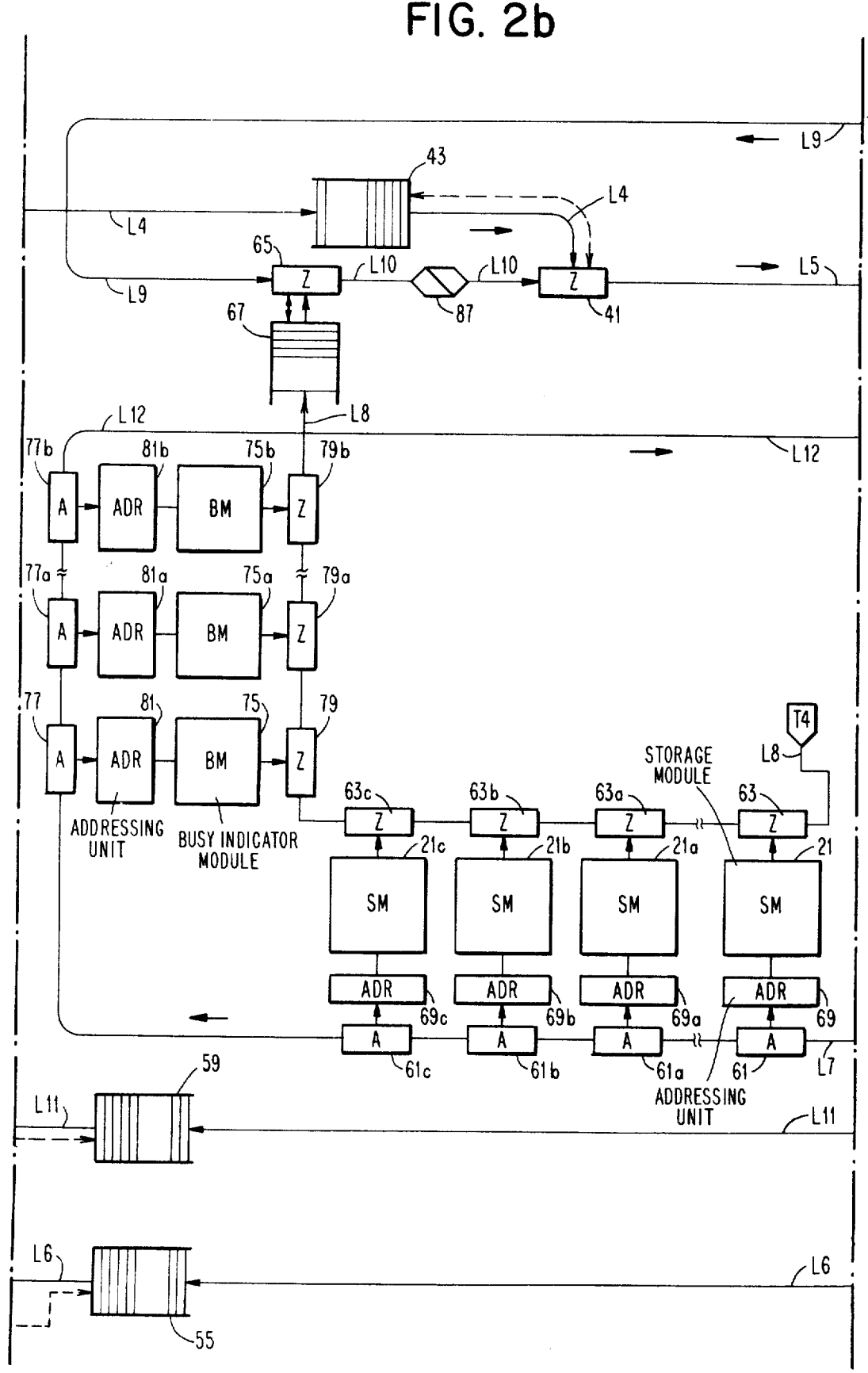
Figure 2C:
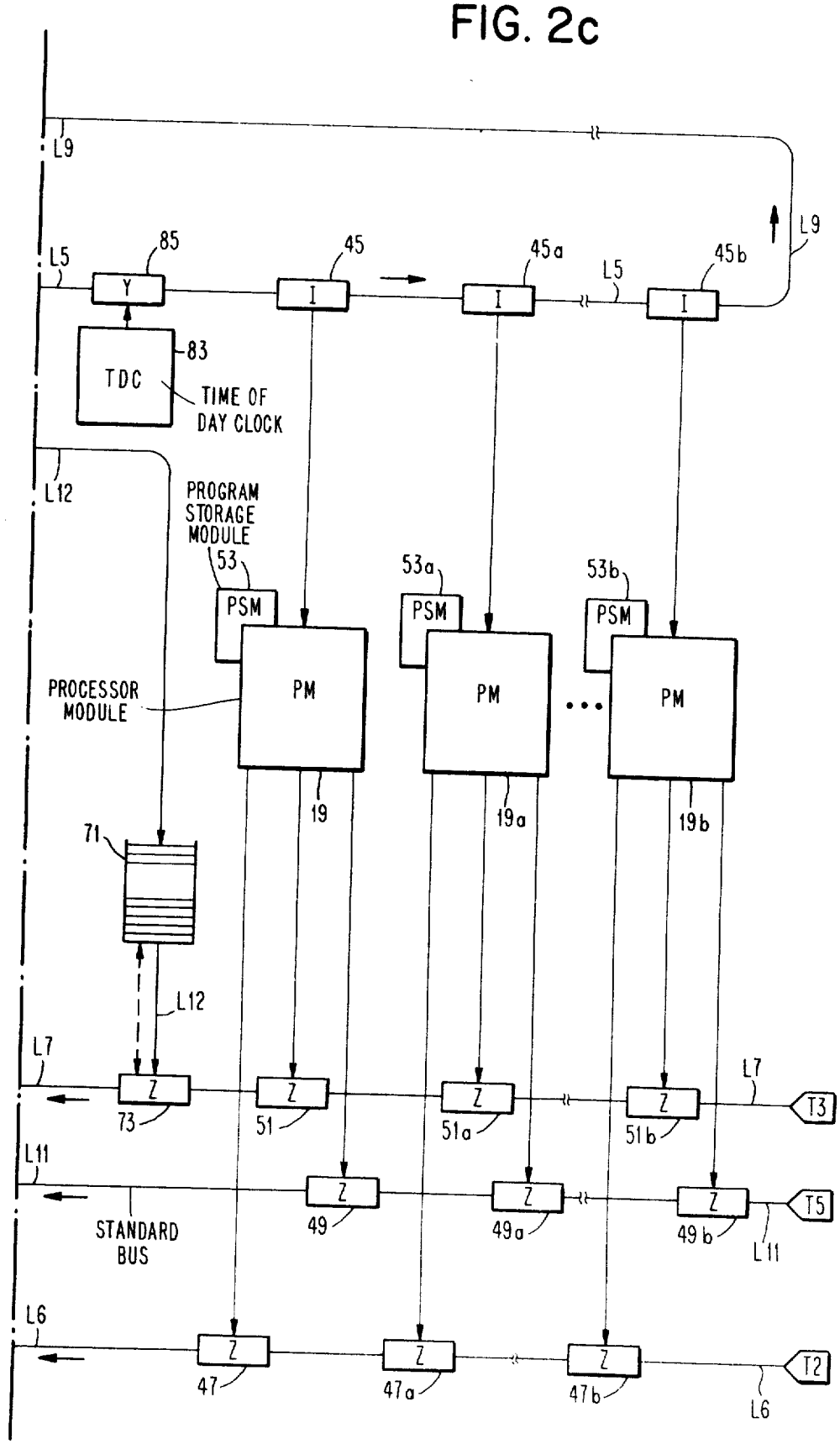

Description of the switching system is now continued in connection with FIGS. 2b and 2c. Input branch L4 connects entrance branch L1 (FIG. 2a) to feeding branch L5. Input branch L4 is terminated by interface unit (X) 17 and (Z) 41. This branch includes a dynamic buffer 43 which can intermediately store a plurality of full frames.

These dynamic buffers are provided in several interconnecting branches of the system. Each of them is connected to a Z-type interface unit. Upon request, the buffers release the frame that was stored for the longest time. Empty frames arriving at their input are not stored. A dynamic buffer store is required whenever two interconnected branches are united, because two frames can arrive simultaneously at these locations. Only one frame can be forwarded, whereas the other frame must be buffered. As one of the interconnecting branches usually has priority, a dynamic buffer is provided in the other branch. A control signal line, shown as a dashed line from a buffer unit to a Z-type interface unit, is provided so that a frame can be released from the buffer when an empty time slot arrives on the priority branch. In some of the buffers, only every nth empty frame is used by this method of control so that empty frames are left for the disposal of interface units further down the interconnecting branch. The number "n" may be dependent on the level of the buffer.

In feeding branch L5, there are a plurality of I-type interface units, 45, 45a, 45b, one for each of the processor modules, 19, 19a and 19b. A frame is shifted by an I-type interface unit to the associated processor, if the latter is functional and not busy, for processing a frame that has previously arrived. A feedback branch L9 and an intermediate branch L10 constitute a closed loop together with feeder branch L5, so that a frame which was not accepted by any of the I-type interface units is returned to the beginning of feeding branch L5. If necessary, this process is repeated several times until a frame can be transferred to a processor module.

Intermediate branch L10 comprises a loop driver 87 which effects synchronization for the frame transmission on the interconnecting branches arranged in a loop structure. Its function is further explained below.

Processor Modules

Each of the processor modules, 19, 19a and 19b is an independent processing unit similar to the processor in a standard processing system. However, it has a smaller instruction set designed for the specific task of communication switching. All processor modules are equivalent in function and operation and any number may be provided for the system.

A processor module accepts a single frame at a time, interprets the status and control information, fetches from a program store, one or more instructions corresponding to the elementary task of the frame, and then executes one processing step. After modifying status data and other data, in accordance with the processing the processor module releases the frame to any one of three output interface units, i.e., (47, 47a and 47b), (49, 49a and 49b), or (51, 51a and 51b). Thereafter, the processor module is in a neutral state and can accept the next frame at its input. Even if a storage access was necessary, no relation remains between frame and processor module. Processing steps before and after the storage access are completely separate from each other and can be executed in different processor modules.

For storing program information, i.e., instructions, preferably, one program storage module PSM (53, 53a and 53b) is assigned to each processor module (19, 19a and 19b) which has direct access to the former. Contents of all program storage modules are equal. The contents can be modified only when a particular code is used which is transferred in a frame or by exchanging parts of the program store.

In principle, one common program storage module can be provided for each processor module which has its own connection for direct access, or one program storage module for each group having a maximum number of processor modules. However, the former solution appears to be the most advantageous.

After processing, a frame can be shifted from a processor module via a Z-type interface unit (47, 47a and 47b) to an output branch bus L6 over which it can proceed to Z-type interface unit 39 (FIG. 2a) and further to exit branch L2. The frame is extracted from this branch for one of the output distributors (15 ... 15n), depending on the marked address it contains. Depending on the control bits, the distributor either shifts the whole frame to the line register corresponding to the originating address or it transfers a single data field into the line register corresponding to the designation address. A dynamic buffer 55 (FIG. 2b) is also provided in output branch L6 because two interconnecting branches are united in Z-type interface unit 39. Data on direct branch L3 has priority and data on branch L6 is bufferred.

Another bus over which the processor modules can release frames is standard branch L11. It connects the processor modules via Z-type interface units (49, 49a and 49b) and Z-type interface unit 57 to entrance branch L1. Over this path, frames without storage access, which have to be handled again by a processor module after a first processing step, can be returned to feeding branch L5.

Storage Modules: A plurality of identical storage modules SM (21, 21a, 21b and 21c, FIG. 2b) are provided to temporarily store data, for which the capacity of a frame is not sufficient, and also to permanently store common converting tables. The number of storage modules can be altered and depends on the requirements of the switching system. Storage modules particularly allow specific services, such as automatic repetition of dialed numbers, dialing with abbreviated numbers, accounting, reversable dual connections, multiple connections, etc.

Storage feeding branch L7 connects processor module output interface unit (Z) (51, 51a and 51b) to storage module input interface unit (A) (61, 61a 61b and 61c). Return branch L8 is provided for returning frames, after storage access, to the processor modules. It connects storage module interface units (Z) (63, 63a, 63b and 63c) to a Z-type interface unit 65 in feeding loop L9-L10-L5. A dynamic buffer 67 connected to Z-type interface unit 65 is also provided in return branch L8.

For each storage module SM (21, 21a, 21b and 21c), an addressing unit ADR (69, 69a, 69b and 69c) is provided comprising at least one register in which a frame is kept during a storage access. In its simpliest form, the addressing unit will select a storage location directly, based on an address contained in the frame, for writing a data unit from a storage data field of the frame into the selected storage location, or for transferring a data unit from the storage location into the storage data field, depending on the indicator bits which are set.

For the present embodiment, it is assumed that each addressing unit is a small processor for handling storage allocation, and for translating an address contained in the frame, i.e., conversion of virtual addresses to real addresses.

Storage modules contain, in addition to areas for tables and other commonly used data blocks, segments which are associated with individual communication lines. Thus, a segment is available for each line. Also, a segment may be distributed over several storage modules. In addition, each segment comprises a static and a dynamic part. The static part is allocated as soon as a communication line is attached to the switching system, and contains the data for a line. This data is never changed. Depending on the current requirement, the dynamic part can be increased or decreased by adding or removing groups of storage locations. Also, the storage module constitutes a working store which temporarily keeps the data necessary for setting up a connection, etc.

Part of the address, which is contained in the frame during storage access, determines a specific storage module. Due to this address part, a frame transferred over storage feeding branch L7 is automatically shifted to the correct storage module by the appropriate interface unit.

A repeat branch bus L12 is provided for returning a frame, that could not be accepted by a storage module when it passed, to the storage feeding branch L7. Re-entering is effected by a dynamic buffer 71 and a Z-type interface unit 73. A frame can circulate on a closed loop L7–L12 until it is accepted by an address storage module.

Also connected to the storage feeding and return branches L7 and L8, by means of A-type interface units (77, 77a and 77b) and Z-type interface units (79, 79a and 79b), are busy indicator modules BM (75, 75a and 75b). Contents of these modules indicate for all communication lines, and possibly for other devices which can be occupied at any time exclusively for one communication line, whether they are busy or available. There function is further explained below in somewhat more detail.

In principle, busy indicator modules BM have the same design as storage modules. However, they contain for each line or each device, a storage location of one byte only. Also, each busy indicator module has its own addressing unit ADR (81, 81a and 81b).

Timing Units

A time-of-day clock 83, furnishing the time-of-day in digital form, is connected to feeding branch L5 by Y-type interface unit 85. Time-of-day clock 83 inserts into each passing frame the current time of day in coded form so that it is always possible to determine at what time a frame was last forwarded to a processor module. This information is useful for accounting purposes and for monitoring.

Clocking units T1, T2, T3, T4 and T5 are connected to the initial points of interconnecting branches L1, L6, L7, L8 and L11. These units generate time slots or empty frames on the connected branches in regular intervals, and are synchronized with loop driver 87. The function of the clocking units is further explained below in more detail.

Interval timer INT 89 shown in FIG. 2a is provided for shifting frames containing an appropriate indication, i.e., interval timer data, into the switching system in regular time intervals or after a fixed time, even if no new data has been inserted into the line register.

A number of peripheral devices 91 complete the system. These devices can be consoles, magnetic tape storage units, magnetic disk storage units, output printers, etc. They are connected to the loop structured network through a peripheral device processor PER 93 and a peripheral device interface means 95.

Peripheral device processor 93 provides control and synchronization, and converts data from the peripheral device format to the frame format of the switching system and vice versa. Peripheral device interface means 95 comprises a Z-type interface unit for connection into entrance branch L1, and an A-type interface unit for connection to exit branch L2. Thus, input into or output from peripheral devices is possible in the same way as it is for line registers and all other functional units of the system.

Data Flow in the Loop Structured Network

The interconnecting busses in the interface units constitute, as already explained above, a network of intercoupled loop structures on which frames are transferred between the various modules of the system. The system comprises five loops. Loops A, B and C are depicted in the simplified system diagram of FIG. 1 in a more general form. Loops A, B and C are depicted in FIGS. 2a through 2c, as well as D and E, in a more detailed form. The loops are described as follows:

A-Loop

Direct connection between line registers, comprising branches L1, L3 and L2.

B-Loop

Connection between line registers and processor modules, comprising branches L1, L4, L5, L6 and L2. Additional branch L12 is a feedback connection to branch L1 and enables multiple circulation.

C-Loop

Connection between processor modules and storage modules, comprising branches L7, L8, L12 and L5.

D-Loop

Closed loop comprising branches L5, L9 and L10, on which a frame can pass the processor interface units, several times, until it is accepted.

E-Loop

Closed loop comprising branches L7 and L12 on which a frame can pass the storage module and busy indicator module interface units several times until it is accepted.

During transfer, each frame is supplemented by a header section (see FIG. 3) and a trailer section to allow correct recognition by the circuits of the interface units. The aforementioned sections have specific bit configurations.

In order to allow shifting of frames containing data onto the loop branches, time slots or empty frames must be generated. This is achieved by clocking units T1 through T5. Each clocking unit regularly generates header sections and trailer sections for the frames. The time intervals between these sections is just sufficient to shift all bits of a frame onto the associated bus, under control of the main clock which is provided by loop driver 87. Furthermore, a particular bit position is marked in each time slot to indicate that this frame is an empty frame. Each Z-type interface unit that releases a frame monitors the communication line for arriving headers followed by an empty frame indication. If an empty frame is recognized, the empty frame bit is turned to "0", and all bits of the immediately stored frame are shifted to the bus.

The number of frames that are "en route" at any time, depends on the number of parallel lines in each interconnecting bus, and on the storage capacity of the interface units. The interface units, which are interconnected to each other, essentially constitute shift register configurations in which frames are continuously shifted in accordance with a main clock.

It is also possible to choose another solution where the clocks of the various branches are independent of each other. Time adjustments are then made at the interface locations between interconnecting branches. Dynamic buffers, already mentioned above, are useful in this connection.

When a frame is to be sent to a particular line register, either an originating address or designation address is marked. When a frame is to be sent to a storage module or a busy indicator module, the appropriate address is inserted and also marked. In a frame, only one address can be marked at any one time. The appropriate A-type interface unit recognizes that the address falls within the range assigned to it, and extracts the frame from the bus and erases the address marking.

Short Frames

If in direct transfer only a short frame is to be used, a corresponding bit position is marked in the line register, i.e., in the frame (see FIG. 3). The scanner then extracts from the line register only that part of the contents which is required for the transfer (storage addresses, time-of-day, etc. are not used for this purpose). Thus, there is a possibility to transfer two sequential short frames instead of one normal frame. However, for this purpose, it is necessary that clocking unit T1 inserts into the middle of each empty frame (time slot), starting with the field "Storage Address" (FIG. 3), a trailer followed by three empty bytes and a succeeding header. In case a normal frame is inserted into the time slot, the additional trailer and header sections are simply written over. However, if a short frame is inserted into the first half of the time slot, the same scanner must set, in the second half of the time slot, the short frame indicator bit and the empty frame indicator bit, so that scanners located further down the bus can recognize that only a short frame may be inserted in the aforementioned slot. Of course, other solutions for accommodating two short frames instead of one normal frame are possible. With the aforementioned methods, a higher direct transfer capacity is achieved for the switching system.

Data Input

When new data is inserted from a communication line into the I/O field of a line register, an "input" indicator bit is set in the frame. The associated scanner then shifts the contents of the line register onto the entrance branch. Thereafter, the frame is forwarded either to a processor module, which processes the input data or stores it into another location, or, in case of direct transfer (existing connection, short frame), the frame is forwarded to the output distributors so that the input data will promptly become output data.

Data Output

If data is to be outputted to a communication line, an "output" indicator bit in the frame is set. Due to the "output" indicator bit, the frame is forwarded to output branch L6 and exit branch L2. Usually, a frame is returned after processing to the originating line register (marking of the original address), and the contents of all fields, except the I/O data field, are inserted into the corresponding fields of the line register. Contents of the I/O data field are inserted by the distributor into the additional output field of the line register. From there it is forwarded to the communication line.

If, after a connection is established, data is to be outputted through a destination line register, then either the destination address is marked or the short frame indicator is set. In either case, the interface unit of the distributor, corresponding to the destination address, extracts the frame from the bus, and transfers the contents of the I/O data field into the additional output field of the destination line register from where it is forwarded to the communication line.

Referring to FIG. 1, to establish a connection, for example, the address of the calling communication line X2 must be inserted into the destination address field of the line register of the called communication line XN. Furthermore, status data must be inserted into line register 11z. The frame of the calling line X2 already contains, as destination address, the address of the called line XN which will be marked. Specific indicator bits "Edit Destination Address," or "Edit Status Data" will also be set, and the address of calling line X2 which is to be inserted as destination address into line register 11z or the required status data, respectively, are inserted into a working data field in the frame belonging to line X2. The frame is then forwarded to the distributor of the called line XN and the contents of the working data field are inserted into the field destination address, or the field processing state, respectively, of the corresponding line register 11z. Furthermore, an input indicator bit is set so that a transfer of the frame from called line XN, with the data just inserted, to a processor module is effected in order to execute a processing step or a storage access as may be necessary.

Busy Indication

If during set up of a connection, a communication line becomes occupied, this status must be stored so that before setting up another connection, it is possible to determine whether the line is available or not. Busy indicator modules BM provided for storing the availability status of storage modules SM, as previously mentioned, are also used as busy indicators for communication lines. In the busy indicator modules, one storage location is assigned to each communications line. As several different occupation status are possible, e.g., simple connection, dual reversible connection, conference connection, accordingly, a byte is provided for each communication line to indicate the type of busy status.

In order to determine whether a called line is available, the frame of the calling line is sent to the busy indicator modules with an appropriate address. The busy indicator byte, corresponding to the call line, is then inserted into the frame and interpreted later by a processor module.

To avoid the situation where a line is initially available, and a third line desiring a connection to a second line also receives an available indication, the following procedure called "Read and Set" is used. For example, when a busy indicator byte is extracted from storage, the particular bit concerned is initially set to "1" in storage no matter what its previous state was, so that in any case, a busy condition is indicated when subsequently a busy test is made. An appropriate mask is carried by the requesting frame in a field provided for that purpose.

If a connection is terminated and a line is released, the busy indication must again be changed. For this purpose, a frame with the appropriate address and a mask specifying the particular bit involved also is sent to busy indicator modules BM.

Frame Format

The format of frames and the functions of the various fields are shown in FIG. 3. Further details of the frame format can be seen from Table I.

TABLE I

| Byte No. | Bit No. | |
|---|---|---|
| 0 and 1 | 0 | Spare |
| | 1 | Time Slot Available (Empty Frame) |
| | 2 | Storage Read |
| | 3 | Storage Write |
| | 4 | Output |
| | 5 | Input |
| | 6 | Busy Indicator Test |
| | 7 | Edit Destination Address |
| | 8 | Edit Status Data |
| | 9 | Read External Device |
| | 10 | '' |
| | 11 | Write External Device |
| | 12 | '' |
| | 13 | Busy Indicator Reset |
| | 14 | Short Frame Marker |
| | 15 | Spare |
| 2...5 | 0 | Originating Address Marker |
| | 1...31 | Originating Address |
| 6...9 | 01...31 | Destination Address Marker |
| 10 and 11 | 0...15 | I/O Data |
| 12...14 | 0...23 | Processing State |
| 15...18 | 0...15 | Storage Address, Base Portion |
| | 16...31 | Storage Address, Displacement |

TABLE I-continued

| Byte No. | Bit No. | |
|---|---|---|
| 19...26 | 0...63 | Working Data |
| 27 | 0...7 | Interval Timer Data |
| 28...30 | 0...23 | Time-of-Day |
| 31...34 | 0...31 | Storage Data |
| 35 | 0...7 | Busy Indicator Data |
| 36 | 0 | Unsuccessful Operation Indicator |
| | 1...7 | Spare |

During transfer, a header section proceeds each frame and a trailer section follows each frame (enclosed by double lines in FIG. 3). These two sections, are of course, not stored in the line registers.

However, each line register comprises an additional output data field of 2 bytes length which is not transferred with the frame. Output data is shifted into this field by distributor 15 when a frame arrives which contains output data for the respective line register. This field may take a position in the line register which during transfer is taken by the trailer section (see FIG. 3).

Input and output data is as follows: Data arriving on the communication line is inserted into the field I/O data, and is also transferred within this field to the processor modules (Input indicator bit set). Data to be outputted on a communication line is inserted by a processor module into the field I/O data (Output indicator bit set), and is transferred to the line registers. In the accepting line register, the address of which is marked in the frame, contents of the field I/O data are shifted into the additional output data field and are subsequently transferred from there to the associated communication line.

Although most functions of the fields, shown in Table I, are obvious from their designations and also from the preceding description of the switching system, several will be explained in more detail.

Processing State (Bytes 12 . . . 14)

This group of bytes indicates to the processor module the current state of the loop control for establishing, maintaining, or releasing a connection. This state indication enables the processor modules to fetch from the program storage module those instructions which are required for executing a processing step.

Working Data (Bytes 19 . . . 26)

In this field, data can be stored intermediately for subsequent utilization. This field constitutes quasi "moving" working registers, since the processor modules have no registers in which data can be retained.

Unsuccessful Operator Indicator (Byte 36, Bit 0)

This bit is set when a required operation could not be executed. The frame is retransferred to a processor module so that the necessary auxiliary operation (e.g., error display on a peripheral device) can be initiated.

The frame format shown in Table I is, of course, only one of many implementations. It is particularly possible to eliminate some of the fields if it is desirable to reduce the line registers and to decrease the time and circuitry necessary for transferring the frames. However, a greater number of processing steps and storage read cycles will be necessary.

OPERATION

Procedures for establishing a connection are in principle in accordance with those commonly used in computer switching systems. An example of the operation of the system is described hereinbelow.

Assume that a subscriber of communication line X2, as shown in FIG. 1, desires a connection to a subscriber at communication line XN. The request is inserted into the I/O data field of line register 11a. The frame then proceeds to a processor module PM, is then sent to the appropriate busy indicator module BM, shown in FIG. 2b, for setting a busy indication, and returns to the processor module. An acceptance indication is then sent with the frame to line register 11a and from there to communication line X2. With each pass through a processor module, status data is modified accordingly.

Details of the type of connection desired and of the subscriber to be called, are now transferred successively in sequential steps from line X2 into the appropriate fields of the frame in line register 11a and if necessary, into an assigned area of storage modules SM, shown in FIGS. 1 and 2b. The dial number of the subscriber to be called is converted into the address of line register 11z and stored as destination address in line register 11a.

Using the frame from line register 11a, a busy test is made in a busy indicator module for line XN, and a busy indication is set for line XN. Again, using the frame from line register 11a, the address of line register 11a is inserted into line register 11z as destination address. Thereafter, status data is inserted in line register 11z in the same way, as already described herein. (See subsection on editing.) Then inquiry data is placed into the output data field of line register 11z. The data then is forwarded over communication line XN to the subscriber to be called.

Accept signals from the called subscriber are now placed into line register 11z and with the aid of the frame from line register 11z, status data and messages for communication line X2 are placed into line register 11a and vice versa, until the connection is completely established. Now the short frame marker (Byte 1, Bit 14) is set to 1 in both line registers.

Thereafter, data units can be transferred from communication lines X2 to XN and vice versa, on the direct transfer path (L1-L3-L2) with the aid of short frames, as already described herein. The short frame marker is, in this situation, equivalent to a marking of the destination address (I/O data of the short frame is always forwarded to the line register of the destination address).

To release a connection, the appropriate line adapter 33 is notified by signalling in a conventional manner to reset the short frame marker thereafter. The line adapter thereupon resets the short frame marker bit so that frames are again transferred to the processor modules. With the aid of the processor modules, further steps are executed for releasing the connection with respect to both communication lines X2 and XN.

While the invention has been particularly described with reference to the preferred embodiments thereof, it will be understood by those skilled in the art that various changes in form and detail may be made therein without departing from the spirit and scope of the invention.

What is claimed is:

1. A modular communication switching system with distributive controls for frame processing comprising:
 a plurality of line registers each having the capacity to store at least one frame, each of said line registers being associated with a particular communication line to be connected;
 a scanning means connected to said line registers for sequentially extracting frames from said line registers and transferring said frames to an entrance bus;
 a decision means connected to said entrance bus for transferring said frames to an input bus depending on the value of a particular indicator bit in said frames, said input bus being connected to a processor feeding bus;
 a plurality of identical processor modules connected in parallel to said processor feeding bus enabling said frames to sequentially interrogate the inputs of said processor modules, each module accepting one of said frames for processing when said processor module does not contain a frame, and after processing, transferring a processed frame to an output bus;
 interfacing means connected to said output bus for transferring said frame from said output bus to an exit bus; and
 a distributor means connected to said exit bus for sequentially forwarding said frames back to said line registers for distribution to said communication lines.

2. A modular communication switching system with distributive controls for frame processing and storage comprising:
 a plurality of line registers each having the capacity to store at least one frame, each of said line registers being associated with a particular communication line to be connected;
 a scanning means connected to said line registers for sequentially extracting frames from said line registers and transferring said frames to an entrance bus;
 a decision means connected to said entrance bus for transferring said frames to an input bus depending on the value of a particular indicator in said frames, said input bus being connected to a processor feeding bus;
 a plurality of identical processor modules connected in parallel to said processor feeding bus enabling said frames to sequentially contact the inputs of said processor modules, each module accepting one of said frames for processing when said processor module does not contain a frame for processing, a first output of said processor modules being connected to an output bus, and a second output being connected to a storage feeding bus;
 a plurality of identical storage modules physically separated from said processor modules connected in parallel to said storage feeding bus for storing data and address converting tables, said storage modules having outputs connected to a return bus which is connected to said processor feeding bus for returning said frames to said processor modules;
 interfacing means connected to said output bus for transferring said frame from said output bus to an exit bus; and
 a distributor means connected to said exit bus for sequentially forwarding said frames back to said line registers for distribution to said communication lines.

3. A modular communication switching system with distributive control having a network of intercoupled loops for transfer of frames between various modules of the system for frame processing comprising:
- a plurality of line registers each having the capacity to store at least one frame, each of said line registers being associated with a particular communication line;
- a scanning means connected to said line registers for sequentially extracting frames from said line registers and transferring said frames to an entrance bus;
- a decision means connected to said entrance bus for transferring said frames to either the input bus or the direct bus depending on the value of a particular indicator bit in said frame, said input bus being connected to a processor feeding bus;
- a plurality of identical processor modules connected in parallel to said processor feeding bus enabling said frames to sequentially interrogate the inputs of said processor modules, each processor module accepting one of said frames for processing if said processor module does not contain a frame for processing, a first output of said processor modules being connected to an output bus, a second output being connected to a storage feeding bus, and a third output being connected to a standard bus;
- a plurality of identical storage modules physically separated from said processor modules connected in parallel to said storage feeding bus for storing data and converting tables, said storage modules having outputs connected to a return bus which is connected to said processor feeding bus for returning said frames to said processor modules;
- interfacing means connected to said direct bus and said output bus for shifting frames to an exit bus; and
- a distributor means connected to said exit bus for sequentially forwarding said frames back to said line registers for distribution to said communication lines.

4. The switching system according to claim 3 further including a plurality of line register modules, each comprising said plurality of line registers, with each line register module having at least one scanning means and one distributor means.

5. The switching system according to claim 3 further including a plurality of line adapters connected between said communication lines and said line register modules, said adapter having means for control and synchronization of data to or from said line register modules.

6. The switching system according to claim 3 further including a plurality of busy indicator modules for storing the status of said communication lines and said storage modules with inputs of said busy indicator modules being connected to said storage feeding bus, and their outputs being connected to a storage return bus.

7. The switching system according to claim 3 wherein each of said processor modules contains a program storage module in which instructions for all processing steps to be executed are stored.

8. The switching system according to claim 3 which includes a plurality of processor feeding bus interfacing means arranged in said processor feeding bus in sequential order for transferring a frame arriving at any one of said processor feeding bus interfacing means to an attached processor module, if said processor module is operative and not yet occupied by a frame; and
- a feedback bus permitting a frame to bypass said processor feeding bus interfacing means of all processor modules when not accepted by said processor modules, said frame being returned to the beginning of said processor feeding bus.

9. The switching system according to claim 3 which includes a plurality of output bus interfacing means in sequential order in said output bus, said output bus interfacing means being connected in parallel to said first output of said processor modules;
- a plurality of storage feeding bus interfacing means arranged in sequential order in said storage feeding bus, said storage feeding bus interfacing means being connected in parallel to said output of said processor modules; and
- a plurality of standard bus interfacing means arranged in sequential order in a standard bus, said standard bus interfacing means being connected in parallel to said third output of said processor modules, said standard bus being connected to said entrance bus; said plurality of output bus interface means, storage bus interface means, and standard bus interface means combining said processed frame from said plurality of processor modules with an empty time frame from a plurality of clocking means, thereby shifting said combined frame, in timed sequence onto said respective buses.

10. The switching system according to claim 3 which includes address responsive means attached to each of said storage modules and each of said busy indicator modules for storage allocation and address translation; and
- a plurality of storage feeding bus interfacing means arranged in sequential order in said storage feeding bus, said interfacing means being connected in parallel to each of said address responsive means in order to transfer frames containing in a particular address field a marked address which falls within an address range assigned to said address responsive means, said frame when not accepted by said address responsive means being returned to said storage feeding bus by a repeat bus.

11. The switching system according to claim 3 further including buffer store means at those points where two busses are interconnected one of said busses being a transferring bus and the other of said busses being an accepting bus, said buffer store means being arranged in said accepting bus for storing frames and releasing frames on request that were stored for the longest time.

* * * * *